US007698248B2

(12) United States Patent
Olson

(10) Patent No.: US 7,698,248 B2
(45) Date of Patent: Apr. 13, 2010

(54) METHOD AND SYSTEM FOR AUDITING PROCESSES AND PROJECTS FOR PROCESS IMPROVEMENT

(75) Inventor: Todd Adam Olson, Raleigh, NC (US)

(73) Assignee: Rally Software, Boulder, CO (US)

( * ) Notice: Subject to any disclaimer, the term of this patent is extended or adjusted under 35 U.S.C. 154(b) by 495 days.

(21) Appl. No.: 11/657,346

(22) Filed: Jan. 24, 2007

(65) Prior Publication Data

US 2008/0177791 A1     Jul. 24, 2008

(51) Int. Cl.
   *G06F 17/00*     (2006.01)
   *G06N 7/00*     (2006.01)
   *G06N 7/08*     (2006.01)

(52) U.S. Cl. ........................................ 706/56
(58) Field of Classification Search ............. 706/56
See application file for complete search history.

(56) References Cited

U.S. PATENT DOCUMENTS

| | | | | |
|---|---|---|---|---|
| 6,073,107 A * | 6/2000 | Minkiewicz et al. | ............ | 705/7 |
| 6,519,763 B1 | 2/2003 | Kaufer et al. | | |
| 6,978,244 B2 * | 12/2005 | Rovinelli et al. | ................ | 705/2 |
| 7,023,979 B1 * | 4/2006 | Wu et al. | ................ | 379/265.11 |
| 7,024,399 B2 * | 4/2006 | Sumner et al. | ................. | 706/45 |
| 7,107,253 B1 * | 9/2006 | Sumner et al. | ................. | 706/45 |
| 7,206,805 B1 * | 4/2007 | McLaughlin, Jr. | .......... | 709/203 |
| 7,277,874 B2 * | 10/2007 | Sumner et al. | ................. | 706/45 |
| 7,290,056 B1 * | 10/2007 | McLaughlin, Jr. | .......... | 709/230 |
| 7,319,992 B2 * | 1/2008 | Gaos | ............................. | 706/62 |
| 7,386,466 B2 * | 6/2008 | McLean et al. | ................ | 705/10 |
| 7,529,811 B2 * | 5/2009 | Thompson | ................... | 709/219 |
| 7,574,740 B1 * | 8/2009 | Kennis | ......................... | 726/22 |
| 7,590,589 B2 * | 9/2009 | Hoffberg | ...................... | 705/37 |
| 2004/0068490 A1 * | 4/2004 | Guibord et al. | ................. | 707/3 |
| 2005/0125271 A1 * | 6/2005 | Peltz | .............................. | 705/7 |
| 2005/0289503 A1 | 12/2005 | Clifford | | |

\* cited by examiner

*Primary Examiner*—Michael B Holmes
(74) *Attorney, Agent, or Firm*—Triangle Patents

(57) ABSTRACT

Systems and methods for auditing knowledge-based projects or methods wherein the users participate in and contribute to generating an automatically updating community data set for obtaining information for evaluating and comparing a target project to best practices and relevant comparables from within the community data to audit likelihood of success and to predict the outcome of the knowledge-based project, and to identify components for improvement or modification to improve the outcome.

19 Claims, 4 Drawing Sheets

METHOD AND SYSTEM FOR AUDITING PROCESSES AND PROJECTS FOR PROCESS IMPROVEMENT

BACKGROUND OF THE INVENTION

1. Field of the Invention

The present invention relates generally to auditing for project management. Further, the present invention relates to gathering data and comparing it with best practices to establish status of a project and corrective actions.

2. Description of the Prior Art

Project management for knowledge-based projects such as software development, research and analytics is a difficult task. It is hard to establish the current status of a project in an accurate fashion. The management of software development projects is even more challenging, because the software development lifecycle is complex. It comprises multiple phases that are carried out sequentially or parallelly. These phases require teams of individuals that are often located in different physical locations to coordinate with each other in an efficient manner to complete all the activities in a given time. Estimating the time required for the software development phases is a harrowing task with which all project managers must cope.

It is even more difficult to estimate the amount of time spent on a particular task in a particular phase of a software development project. This is because team members often work on multiple software development projects simultaneously. It is important to have an accurate estimate of the time spent on a project by all team members in order to accurately estimate the time remaining and the completion date of the project. An accurate estimate of time spent also helps provide managers with knowledge about the current status of the project, and determine whether the project is proceeding as planned.

Traditionally, project managers estimate time spent on a project by requesting the team members to fill out weekly or daily timesheets. The team members fill these time sheets from memory, and hence these do not provide an accurate estimate of the time spent on the various activities of a project. This in turn leads to an inaccurate picture about the current status of a project. Without a clear picture about the current status of a project, it becomes even more difficult to predict the completion date for a project and adhere to it.

It is also difficult to estimate the performance of teams with such inaccurate data. One measure of performance is comparison of the team's performance with industry wide best practices. Since the best practices are computed by collecting performance data, which is inaccurate from the beginning, from multiple sources, the comparison will also not yield an accurate picture of the state of the current processes.

There are numerous attempted solutions that try to address this problem. One such example is U.S. Pat. No. 6,519,763 titled "Time Management and Task Completion and Management Software" by Kaufer et al. This patent describes an apparatus for ascertaining project completion and managing a project with high efficiency and accuracy. It comprises data collectors that automatically gather data that is generated from various tools, such as scheduling, defect tracking, and other software management and quality tools. The data is analyzed to generate statistical measures relating to the status of the project. The data collectors collect data from project management software, defect reports, testing reports and other sources that provide information about the project status.

Another such solution is described in US Patent Application Pub. No. 20050289503 titled "System for Identifying Project Status and Velocity through Predictive Measures" by Clifford. This patent application describes a method for providing visibility into the real time progress and status of software development projects by collecting measures from software development tools about the progress of the project, examining data sources created during the progress of the project and evaluating the collected data by using expert reasoning system based on causal modeling to arrive at project velocity views. The system collects data from sources such as configuration management systems, defect management systems, project management system and source code.

Although other systems try to address the problem of estimating project completion and project status accurately, they fails to address the need for a system that compares project status information with best practices in the industry. Further, the other systems do not describe a way in which project completion information from various companies and offices can be stored to generate best practices without compromising the security of the data. Additionally, the other attempted solutions do not describe a system that stores project related data from multiple organizations to develop community based best practices. The best practices should be classified on the basis of the type of project, the organization type and size and other suitable metrics.

From the above discussion, it is clear that there is a need for a system that will collect data across organizations and store the data in such a way that privacy of the organizations is not compromised. Further, the system should be able to generate best practices from the collected data and to provide comparisons about current trends of a project with the industry best practices. Thus there remains a need in the art for systems and methods that collect, aggregate, and analyze community data to provide anonymized, comparable information regarding project metrics, in particular for service processes that are not readily systematized.

SUMMARY OF THE INVENTION

A first aspect of the present invention is to provide a method for auditing a knowledge-based project for a first subscriber, the first subscriber having at least one first user participating in the knowledge-based project, the method including the steps of:

a. obtaining data relating to at least one additional knowledge-based project from at least one additional subscriber, the obtained data forming community data;

b. obtaining data relating to the knowledge-based project from the first subscriber, the obtained data forming subscriber data; and c. comparing the community data with the subscriber data to predict the outcome of the knowledge-based project.

A second aspect of the present invention is to provide a system for auditing a knowledge-based project for a first subscriber, the first subscriber having at least one user participating in the knowledge-based project, the system including:

a. a server for storing community data and subscriber data, the community data collected from at least one additional subscriber performing at least one additional knowledge-based project, the subscriber data collected from the at least one user belonging to the first subscriber, the community data relating to the at least one additional knowledge-based project and the subscriber data relating to the knowledge-based project;

b. a computational device for predicting an outcome of the knowledge-based project of the first subscriber by comparing data obtained from the knowledge-based project with the community data; and c. a client connected to the server and the computational device for providing the predicted project outcome to the at least one user belonging to the first subscriber.

These and other aspects of the present invention will become apparent to those skilled in the art after a reading of the following description of the preferred embodiment when considered with the drawings, as they support the claimed invention.

DETAILED DESCRIPTION OF THE PREFERRED EMBODIMENTS

Figure 1:
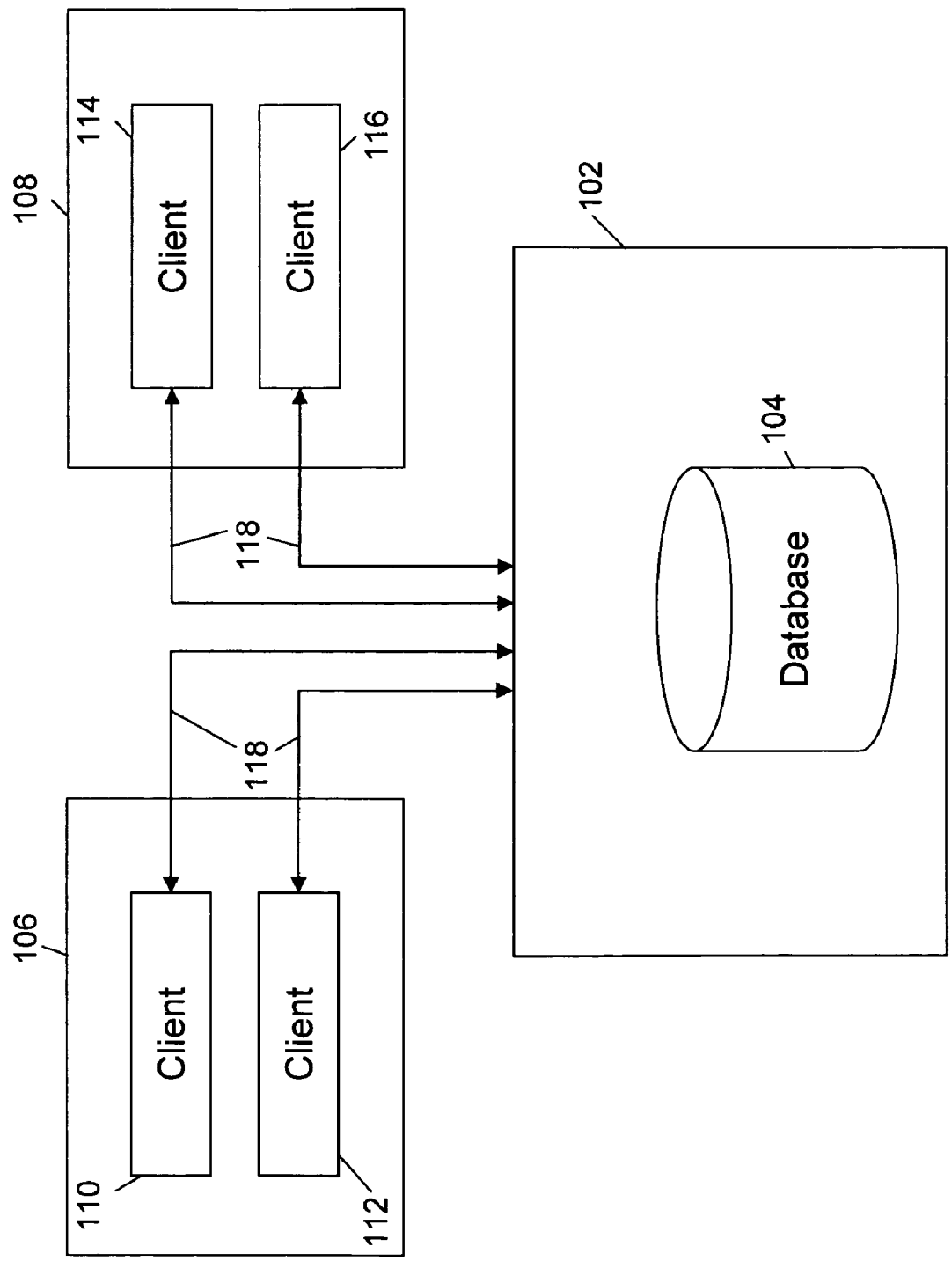
FIG. 1 is a schematic of the overall system, in accordance with an embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

The present invention provides systems and methods for auditing knowledge-based projects or methods wherein the users participate in and contribute to generating an automatically updating community data set for obtaining information for evaluating and comparing a target project to best practices and relevant comparables from within the community data to audit likelihood of success and to predict the outcome of the knowledge-based project, and to identify components for improvement or modification to improve the outcome.

The present invention provides a system for auditing knowledge-based projects and methods to identify best practices for the projects and processes, including auditing the target project compared to comparable community data and known best practices. Knowledge-based projects or processes include software development projects, business consulting type of projects, knowledge-based consulting projects, or any other project in which a user's knowledge is used for completing at least a part of the project. Knowledge-based projects share a common problem, that is difficulty in estimating the time spent in the project and the completion date of the project.

The knowledge-based projects are audited by obtaining data about the project to be audited and comparing that data with best practices data. Best practices data is obtained by aggregating data that is stored from multiple knowledge-based projects and from multiple entities. In aggregating the data, no company specific information is disclosed to users of other companies.

In the preferred embodiment, data is collected from multiple applications or tools that are used in the software development project lifecycle. Stages in the software development project lifecycle include, but are not limited to, design and development. Activities in the software development project lifecycle include, but are not limited to, coding, testing, and bug fixing. This data is then transferred to a database at a central location. Data is collected from multiple users in multiple organizations and stored in the database. This data can then be aggregated to form best practices. These best practices can be based on organization size, location, specialization, or any other attribute related to organizations, based on project phase, project tasks, or any other project related attribute. The best practices include but are not limited to indication of the time it should take to complete a project; profile of resources required to complete the project, including human resources having different skill sets; types of tasks, operations, and/or functions to be included and ordering of those tasks and/or operations necessary to complete the project. These best practices including showing the timeline of a project and the important tasks and phases that should be completed. Based on the best practices and phases or tasks actually completed for the target or given project being considered, a user can estimate the current status of the project and a completion data for the project.

Preferably, the steps for auditing a subscriber's knowledge-based project include, but are not limited to, the following:

1. obtaining community data relating to multiple other knowledge-based projects from multiple entities;
2. obtaining subscriber data relating to the subscriber's knowledge-based project; and
3. comparing the community data with the subscriber data to predict the outcome of the knowledge-based project.

The data compared with the subscriber data can be a subset of the community data. This subset can be selected by an attribute of the subscriber. This attribute can be, for example, a stage in the software development project lifecycle, an activity of software development, the subscriber's size and/or location, etc.

Preferably, the project's outcome is predicted by analyzing the current project status with the community data to obtain a predictive end date of the current project. For example, the project's outcome may be predicted by comparing the actual current status of the project with the expected current status of the project obtained from community data. The present invention systems and methods function to provide or identify other like projects from the community compared to a target or given project being evaluated, compared, or considered, wherein the community data may include information from within the target organization itself, as well as outside or third party entities. In any case, the community data used to identify like projects also considers entities having similar size of project and/or project team, similar project scope, similar technology usage, and analyzes these factors at the same time to provide an evaluation outcome from the systems and methods of the present invention.

By way of example and not limitation, one application for the systems and methods for auditing processes and projects for process improvement according to the present invention includes software development functions. More specifically, as a case example, in a one month iteration for a software development project, wherein the project has advanced partially through the iteration, such as about 2 weeks, a similar or like project based upon information drawn from the community data and best practices will compare a project of similar scope, team size, etc. and evaluate the current, given, or target project as compared with that data and best practices to determine whether or not the development iteration is likely to successfully be completed on target on time with a satisfactory quality level. If not, then changes can be made to resources, scope, etc. in order to adjust the project to meet the deadline or adjust the resources allocated, or a combination.

Referring now to the drawings in general, the illustrations are for the purpose of describing a preferred embodiment of the invention and are not intended to limit the invention thereto. FIG. 1 is a schematic of the overall system, in accordance with an embodiment of the present invention. The system comprises server 102. Server 102 comprises database 104. The system also comprises subscribers 106 and 108. Subscribers 106 and 108 are organizations that have access to connect to server 102. In the preferred embodiment, subscribers 106 and 108 are individuals, organizations, companies, software development communities, etcetera. Subscriber 106 comprises multiple clients 110 and 112. Similarly, subscriber 108 comprises multiple clients 114 and 116. Clients 110, 112, 114 and 116 preferably are personal computers, laptops, PDA's, mobile devices, tablet PC's or any other device with computational ability. Clients 110 and 112 belong to subscriber 106 or are operated by users who are affiliated with subscriber 106. Similarly, clients 114 and 116 belong to subscriber 108 or are operated by users who are affiliated with subscriber 108. The number of subscribers and clients may vary. For example, a large number of subscribers can be present in the system. Similarly, the number of clients per subscriber can vary in number. Clients 110, 112, 114, and 116 are connected to server 102 via network 118. An example of network 118 is the Internet. In other embodiments, network 118 can be a local area network, wide area network, wireless network, or other mode of communication between a server and a client. Alternatively, database 104 is separate from server 102 and is connected to server 102 via a network or other mode of communication.

Figure 2:
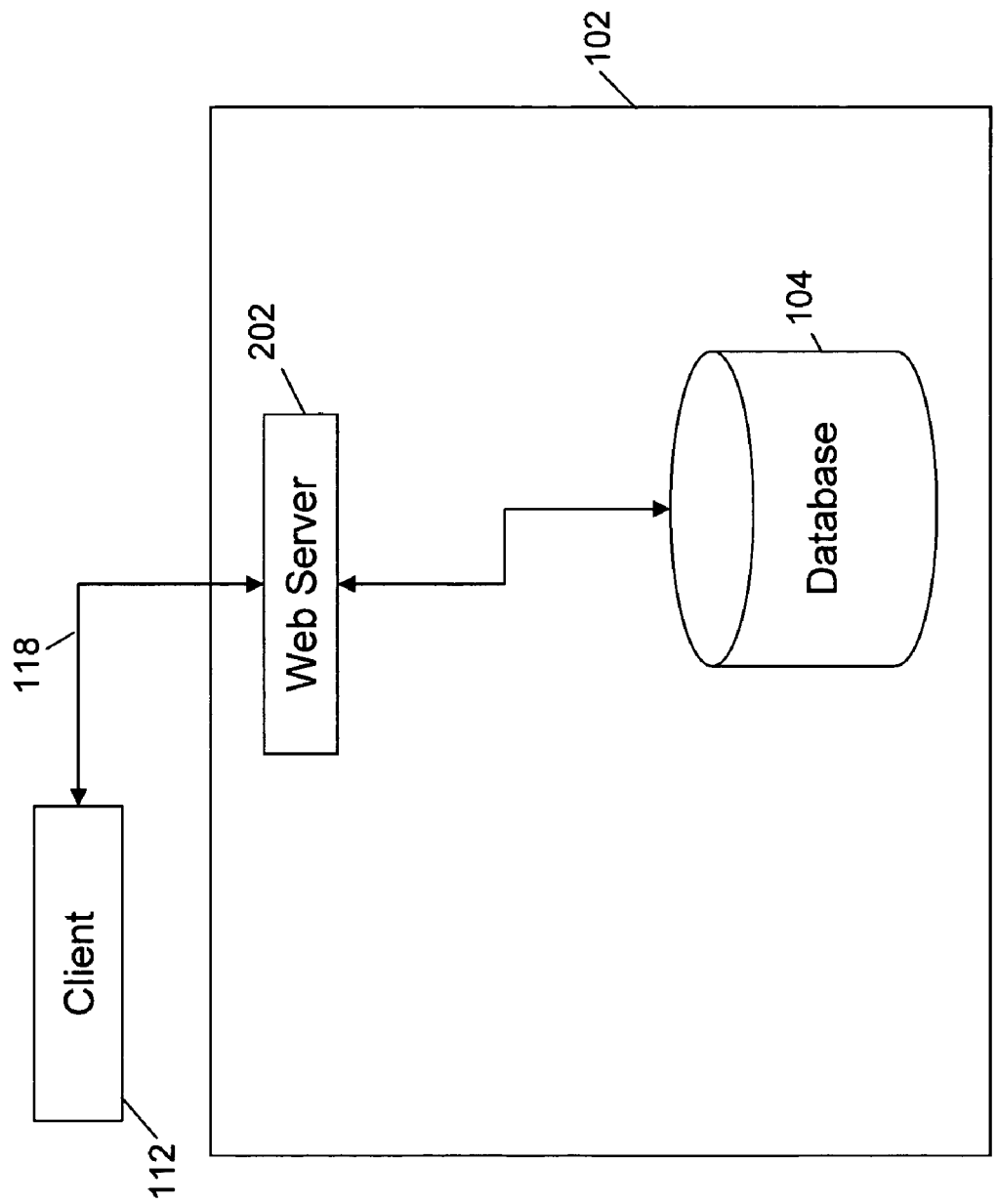
FIG. 2 is another schematic diagram in accordance with an embodiment of the present invention.
Figure 3:
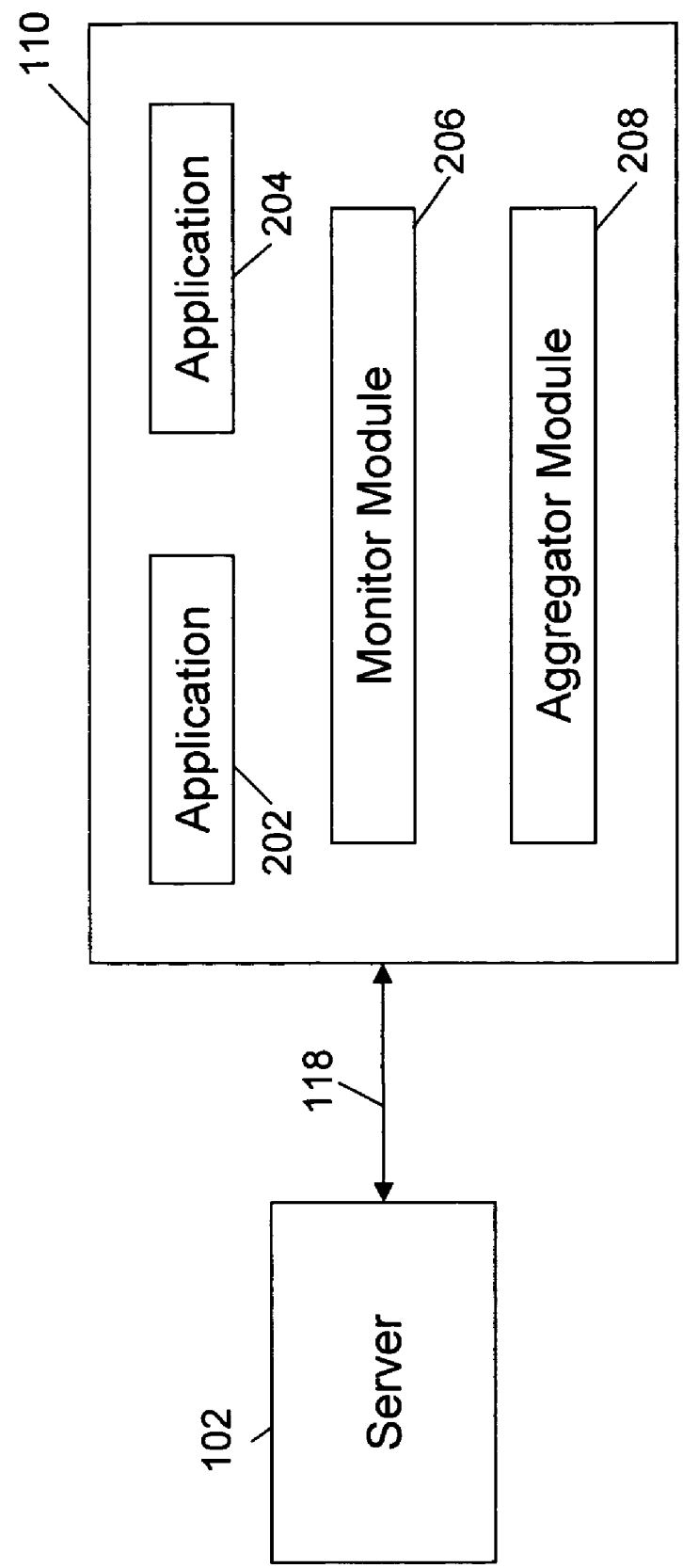
FIG. 3 is another schematic diagram in accordance with an embodiment of the present invention.
Figure 4:
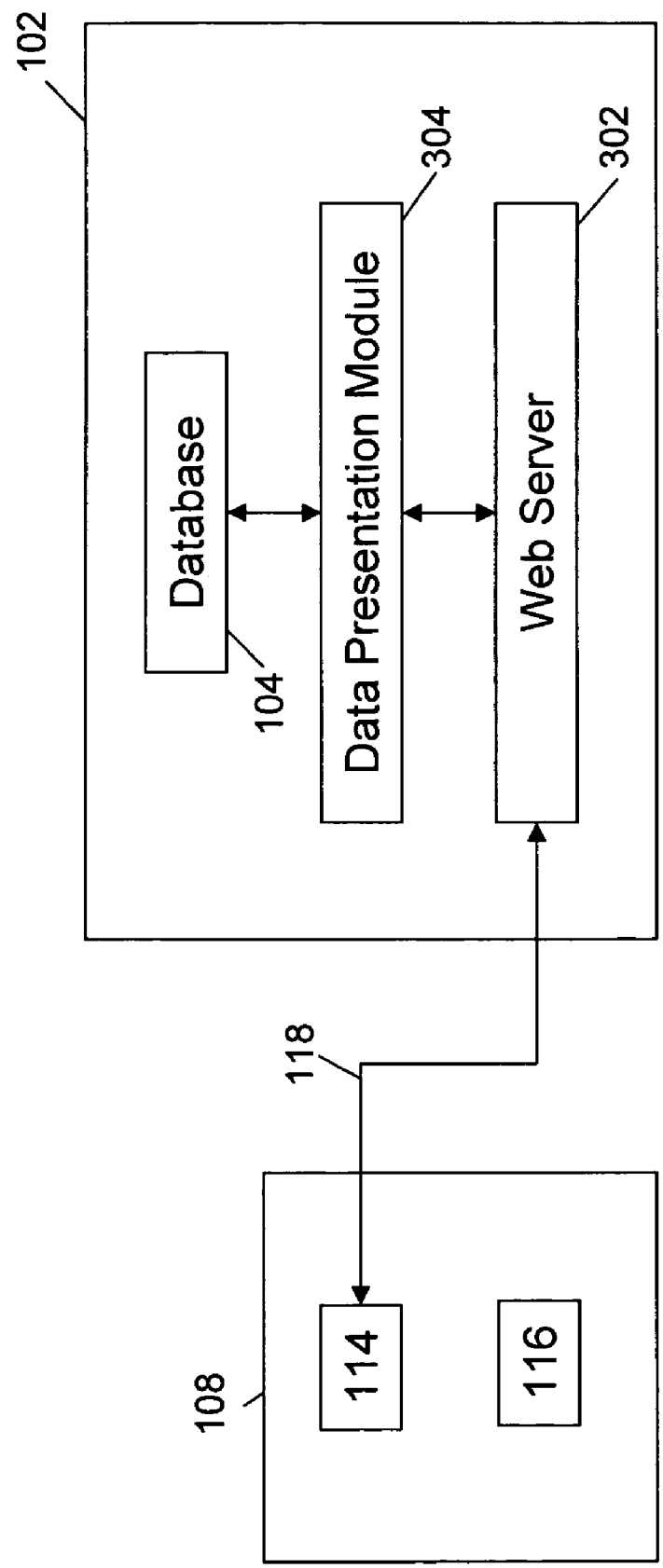
FIG. 4 is another schematic diagram in accordance with an embodiment of the present invention.

FIG. 2 is a schematic of the server system, in accordance with another embodiment of the present invention. In addition to database 104, server 102 also comprises web server 202. By way of example, web server 202 acts as an interface between client 112 and database 104. It receives requests from client 112 to view industry best practices, or best practices based on specific criteria. It then filters these requests to database 104 and receives data from database 104 based on the request. The received data is then filtered and organized before being displayed to client 112. Web server 202 also acts as a protection layer, so that only authorized clients can view project data or best practices data. Client 112 sends a request to view best practices data and compare that data with the status of an ongoing project that has client 112 as an assigned user. Web server 202 receives the request and authenticates client 112. It verifies that client 112 is authorized to view project information for the ongoing project and whether client 112 is authorized to view the best practices data. If web server 202 determines that client 112 is allowed to view the requested data, then it queries database 104 for the requested data.

Web server 202 queries database 104 for best practices data. Database 104 does not store aggregated best practices data, but the data is stored as individual data points for multiple clients and multiple subscribers. These data points are aggregated to form best practices data. The method of aggregation depends on the type of best practices data requested and one or more criteria for the best practices data. In forming the best practices, data from multiple data points is made anonymous. This means that any company related information that is stored with the data is removed. This ensures that company specific information is not shared with other companies. Hence, the privacy of the companies using this service is protected. At the same time, the now anonymous company data is shared so that other companies can benefit from the data in an aggregated form.

Preferably, best practices are established using industry standards, individual experts, standards organizations, and the like and combinations thereof. Best practices may also be internally generated, but typically include some comparison to a broader, more global data set. Where best practices emerge from data, these are preferably empirically-oriented best practices. Depending upon the type of process or project to be audited and compared or evaluated with the systems and methods of the present invention, best practices may include either external or internal sources. For example, in the function of ordering tasks, relevant factors include identification of types of resources for each task or project, including technological resources and human resources. Other relevant factors include geography, skill sets, experience level for human resources and their allocation for a given task or project.

Certain modifications and improvements will occur to those skilled in the art upon a reading of the foregoing description. By way of example, while the software development processes are used as an example of an application of the systems and methods of the present invention, broader application extends beyond software development and includes, but is not limited to applications for hardware such as chip design, pharmaceutical projects including research and development, design, such as industrial design, creative product design, and web design, and consulting services, including business process optimization, marketing tasks or projects, and the like, and any other knowledge-driven processes that are not optimized or highly automated, including those having loosely or poorly defined processes. All modifications and improvements have been deleted herein for the sake of conciseness and readability but are properly within the scope of the following claims. The above mentioned examples are provided to serve the purpose of clarifying the aspects of the invention and it will be apparent to one skilled in the art that they do not serve to limit the scope of the invention.

What is claimed is:

1. A method for auditing a knowledge-based project for a first subscriber, the first subscriber having at least one first user participating in the knowledge-based project, the method comprising the steps of:
    a. obtaining data relating to at least one additional knowledge-based project from at least one additional subscriber, the obtained data forming community data, which is based on comparables from more than one entity within the community;
    b. obtaining data relating to the knowledge-based project from the first subscriber, the obtained data forming subscriber data; and
    c. comparing the community data with the subscriber data for comparing a target project with the community data to predict the outcome of the knowledge-based project.

2. The method of claim 1, wherein the subscriber data further comprises data collected from at least one additional user participating in the knowledge-based project.

3. The method of claim 1, wherein the knowledge-based project is a software development project.

4. The method of claim 3, wherein the subscriber and/or the community data is obtained from software development lifecycle activities.

5. The method of claim 1, wherein the community data comprises subscriber specific data and the first subscriber cannot view the subscriber specific data from any of the at least one additional subscribers.

6. The method of claim 1, wherein the first subscriber can view the subscriber data collected from the first subscriber.

7. The method of claim 1, wherein the community data is obtained by aggregating data relating to the knowledge-based project from the first subscriber and data relating to the at least one additional knowledge-based project from the at least one additional subscriber.

8. The method of claim 1, wherein the community data is derived from a subset of data obtained by aggregating data relating to the knowledge-based project from the first subscriber and data relating to the at least one additional knowledge-based project from the at least one additional subscriber.

9. The method of claim 8, wherein the subset of the data is selected using an attribute of the first subscriber and the attribute is obtained from at least one stage of a software development project.

10. The method of claim 8, wherein the subset of the data is selected using an attribute of the first subscriber and the attribute is obtained from at least one activity in the software development project.

11. The method of claim 8, wherein the subset of the data is selected using an attribute of the first subscriber and the attribute is a size of the first subscriber, a location of the first subscriber, a primary activity of the first subscriber, a number of employees of the first subscriber subscriber, or other first subscriber specific attributes.

12. The method of claim 7, wherein the knowledge-based project has a current completion status and the outcome of the knowledge-based project is predicted by comparing the current project completion status with the community data to obtain a predictive end date for the knowledge-based project.

13. The method of claim 1, further comprising the step of aggregating subscriber data and community data to obtain best practices data for the knowledge-based project.

14. The method of claim 13, further comprising the step of comparing the current knowledge-based project with the best practices to determine the completion time of the current knowledge-based project.

15. The method of claim 13, wherein the best practices are obtained by aggregating subscriber data and community data for knowledge-based projects sharing a common attribute.

16. A system for auditing a knowledge-based project for a first subscriber, the first subscriber having at least one user participating in the knowledge-based project, the system comprising:

a server for storing community data and subscriber data, the community data collected from at least one additional subscriber performing at least one additional knowledge-based project, the subscriber data collected from the at least one user belonging to the first subscriber, the community data relating to the at least one additional knowledge-based project, which is based on comparables from more than one entity within the community, and the subscriber data relating to the knowledge-based project;

a computational device for predicting an outcome of the knowledge-based project of the first subscriber by comparing data obtained from the knowledge-based project with the community data; and a client connected to the server and the computational device for providing the predicted project outcome to the at least one user belonging to the first subscriber.

17. The system of claim 16, wherein the subscriber data and community data contain information about time required to complete at least one knowledge-based project.

18. The system of claim 16, wherein the subscriber data and the community data contain information about time required to complete at least one task of a knowledge-based project.

19. The system of claim 16, wherein the subscriber data and community data are protected so that the first subscriber cannot view data from the at least one additional subscriber.

* * * * *